United States Patent [19]

Moy

[11] Patent Number: 5,938,831

[45] Date of Patent: Aug. 17, 1999

[54] WATER AND UV RESISTANT CLEAR COAT SEALANT AND FINISH FOR WOOD SIGNS AND OTHER SURFACES

[76] Inventor: Robert S. Moy, 1316 Bernal Ave., Burlingame, Calif. 94010

[21] Appl. No.: 09/193,164

[22] Filed: Nov. 16, 1998

[51] Int. Cl.[6] .......................... C09D 5/00; C09D 191/00; C09D 193/04
[52] U.S. Cl. ............................................. 106/224; 524/313
[58] Field of Search .............................. 106/224; 524/313

[56] References Cited

U.S. PATENT DOCUMENTS 1,992,010   2/1935   Kittredge ................................. 106/224

*Primary Examiner*—David Brunsman
*Attorney, Agent, or Firm*—Robert Bergstrom

[57] ABSTRACT

A water-resistant and UV-resistant clear coat sealant and finish for protecting wood signs from weathering. The sealant is applied as a viscous liquid to the surface of the sign and allowed to stand until dry. It dries to a clear, durable protective coating with a satin luster.

5 Claims, No Drawings

WATER AND UV RESISTANT CLEAR COAT SEALANT AND FINISH FOR WOOD SIGNS AND OTHER SURFACES

TECHNICAL FIELD

The present invention relates to the field of one-step water-resistant sealants and finishes for protecting surfaces from weather damage, and, in particular, a water-resistant and UV-resistant one-step sealant and finish for protecting wood signs from weathering and for protecting and beautifying furniture.

BACKGROUND OF THE INVENTION

Wood signs are continuously exposed to rain, sunlight, and temperature extremes. Over time, exposure to water and ultra-violet radiation structurally and chemically changes the surface of wood and leads to the set of characteristics known as weathering. These characteristics include loss of color, loss of natural aromatic oils and waxes, checking and fracturing of the wood surface, and growth of molds, fungus, and bacteria that cause further chemical and structural degradation.

Wood signs are normally coated with varnish, shellac, polyurethane, linseed oil, or other common finishes. These finishes are dissolved in a volatile hydrocarbon solvent and applied as a liquid to the surface of the sign. Following application, the volatile hydrocarbon solvent evaporates and the long polymer molecules of the finish chemically interact by forming covalent cross-links with one another to form a hard, water-resistant finish. The finish prevents the loss of natural oils and waxes from the wood, and prevents water and living organisms from entering the wood. In addition, these finishes are clear, so that the natural color and patterns of the wood surface remain visible through the finish. Unfortunately, all of these finishes break down, over time, when exposed to water and sunlight. UV-radiation causes chemical damage to the polymer molecules, breaking polymer backbones and crosslinks and leading to loss of integrity of the finish. These common finishes generally deteriorate and become permeable to water within several years. The only remedy is to remove the degraded finish, along with some amount of the wood surface, and refinish the sign. This is an expensive and time consuming procedure, and one that can be done only a limited number of times.

A need has therefore been recognized for a durable, weather-resistant finish for wood signs that preserves the natural color and pattern of the wood surface.

SUMMARY OF THE INVENTION

The present invention is a water-resistant and UV-resistant one-step clear coat sealant and finish for protecting wood signs from weathering. The clear coat sealant and finish is also well-suited for finishing furniture.

DETAILED DESCRIPTION OF THE INVENTION

The present invention is a water-resistant and UV-resistant, one-step clear coat sealant and finish for protecting wood signs from weathering and for protecting and beautifying the surfaces of furniture and other products. The weather-resistant sealant and finish is prepared as a viscous liquid that is applied in a thick layer, or full coat, to the surface of a wood sign. The weather-resistant sealant and finish is then allowed to stand for between two and four days, depending on the ambient temperature, to produce a clear, durable, satin finish that shows no appreciable deterioration even after years of exposure to weather, sunlight, and temperature extremes. The weather-resistant sealant and finish is applied in a full coat to furniture, allowed to stand for a length of time between one hour and eight hours, depending on the ambient temperature, and then, before the weather-resistant sealant and finish begins to harden and set, the weather-resistant sealant and finish is rubbed off the surface with a cloth. After 4 days, the surface can be polished to produce a hand-rubbed luster glow finish.

One quart of the weather-resistant sealant and finish is prepared from 11.25 liquid ounces of paint thinner, 8.75 liquid ounces of boiled linseed oil, 4.75 ounces of paraffin, 6 liquid ounces of Man O' War marine varnish manufactured by McCloskey Varnish Company, and 0.95 ounces of Non-Gell A Aluminum Stearate by the following procedure. First, the boiled linseed oil and marine varnish are combined together in a metal vessel. The paint thinner is then stirred into the mixture and heated on an electric burner. As the mixture begins to warm, the aluminum stearate powder is stirred into the mixture. Finally, the paraffin is added and allowed to melt while the mixture is continuously stirred. The mixture is continuously stirred and heated to 90° C., and then allowed to cool to room temperature before application to a wood surface.

Although the present invention has been described in terms of a preferred embodiment, it is not intended that the invention be limited to this embodiment. Modifications within the spirit of the invention will be apparent to those skilled in the art. For example, any high-quality marine varnish can be substituted for the specific brand of marine varnish used in the preferred embodiment. As another example, any of many different types of volatile hydrocarbon solvents can be substituted for the paint thinner used in the preferred embodiment. The scope of the present invention is defined by the claims that follow.

I claim:

1. A water-resistant and UV-resistant clear coat sealant and finish for wood signs, 1 quart of the liquid clear coat sealant and finish comprising:
    about 11.25 liquid ounces of a volatile hydrocarbon solvent;
    about 8.75 liquid ounces of boiled linseed oil;
    about 6 liquid ounces of marine varnish;
    about 4.75 ounces of paraffin; and
    about 0.95 ounces of non-gel A aluminum stearate.

2. A method for preparing the clear coat sealant and finish of claim 1, the method comprising:
    combining the boiled linseed oil and marine varnish together;
    stirring the volatile hydrocarbon solvent into the mixture;
    heating the resulting mixture;
    stirring the aluminum stearate into the mixture;
    adding the paraffin to the mixture;
    heating the mixture to 90° C. while stirring the mixture; and
    allowing the clear coat sealant and finish produced by the above steps to cool to room temperature.

3. A method for weather-proofing wood signs using the clear coat sealant and finish of claim 1, the method comprising:
    applying a full coat of the liquid clear coat sealant and finish to the surface of the sign; and allowing the applied to clear coat sealant and finish to stand until dry to a satin finish.

4. A method for finishing furniture and other products with porous surfaces using the clear coat sealant and finish of claim 1, the method comprising:

applying a full coat of the liquid clear coat sealant and finish to the surface of the furniture;

allowing the applied clear coat sealant and finish to stand for between one hour and eight hours, depending on the ambient temperature;

before the applied clear coat sealant and finish has begun to harden, rubbing the applied clear coat sealant and finish from the surface of the furniture;

allowing the surface of the furniture to dry for about four days; and polishing the surface to a satin glow luster.

5. A water-resistant and UV-resistant clear coat sealant and finish for wood signs according to claim 1, wherein the volatile hydrocarbon solvent comprises paint thinner.

* * * * *